3,393,241
PREPARATION OF NITRODIARYLAMINES
Earl A. Nielsen, Lombard, Ill., assignor to Universal Oil
  Products Company, Des Plaines, Ill., a corporation of
  Delaware
No Drawing. Filed Mar. 22, 1965, Ser. No. 441,883
10 Claims. (Cl. 260—576)

ABSTRACT OF THE DISCLOSURE

Reaction of halonitro aromatics with amino aromatics, such as the reaction of o-nitrochlorobenzene with aniline, in the presence of a hydrogen halide acceptor comprising a Group II metal oxide, such as calcium or magnesium oxide.

---

This invention relates to a process for the preparation of nitrodiarylamines by the reaction of an amino aromatic compound with a halonitro aromatic compound in the presence of a novel hydrogen halide acceptor. In a preferred embodiment, the present invention relates to the condensation of aniline with o-chloronitrobenzene in the presence of a novel hydrogen chloride acceptor.

An economical and convenient method for the preparation of o-nitrodiphenylamine is highly desirable since its reductive alkylation with cyclohexanone, for example, yields N-phenyl-N'-cyclohexyl-o-phenylenediamine which is useful as a rubber antiozonant. In addition, o-nitrodiphenylamine has in itself desirable inhibitor characteristics with respect to gasoline.

An economical and convenient method of preparation would appear to be by the direct condensation of o-nitrochlorobenzene with aniline. In the course of this condensation reaction, hydrogen chloride is formed, and removal of the same is essential in order to obviate formation of undesirable hydrogen chloride salts of the amine starting material. This is accomplished by the inclusion of a hydrogen chloride acceptor in the reaction mixture. Potassium carbonate and related compounds, e.g., sodium carbonate, calcium carbonate, etc., have generally been considered to be most suitable for this purpose.

This method of preparation is hampered by the formation of small but detrimental amounts of tarry by-products which seriously limit commercial application of the process. It has been observed that tar formation is minimized by distillation, or other purification, of the o-nitrochlorobenzene starting material prior to utilization of the same in the condensation reaction.

It is an object of this invention to provide a novel process for the preparation of diarylamino compounds, particularly o-nitrodiphenylamine, useful in themselves and as chemical intermediates. It is a further object to present a novel process for the direct condensation of o-nitrochlorobenzene and aniline which is not dependent on pre-distillation or other purification of the o-nitrochlorobenzene reactant to obviate or minimize formation of tarry by-products.

The improved process of this invention results from the utilization of a hydrogen chloride acceptor which is novel to the condensation reaction herein contemplated. For example, in one of its broad aspects, the present invention embodies a process for the preparation of a nitrodiarylamine which comprises reacting a halonitro aromatic compound with an amino aromatic compound of the general formula $ArNH_2$, in which Ar is an aromatic hydrocarbon radical, at an elevated temperature in the presence of an oxide of a metal of Group II of the Periodic Table while maintaining substantially anhydrous reaction conditions.

Another embodiment of this invention relates to a process for the preparation of a nitrodiarylamine and comprises reacting a chloronitrobenzene with an amino aromatic compound of the general formula $ArNH_2$, in which Ar is an aromatic hydrocarbon radical, at a temperature of from about 150° C. to about 300° C. in the presence of an oxide of a metal of Group II of the Periodic Table while maintaining substantially anhydrous reaction conditions.

A further embodiment relates to a process for the preparation of a o-nitrodiarylamine which comprises reacting o-chloronitrobenzene with an amino aromatic compound of the general formula $ArNH_2$, in which Ar is an aromatic hydrocarbon radical, at a temperature of from about 150° C. to about 300° C. in the presence of an oxide of a metal of Group II of the Periodic Table while maintaining substantially anhydrous reaction conditions.

One of the more specific embodiments of this invention concerns a process for th preparation of o-nitrodiphenylamine and comprises reacting o-chloronitrobenzene with aniline at a temperature of from about 175° C. to about 225° C. in the presence of calcium oxide while maintaining substantially anhydrous reaction conditions.

Another of the more specific embodiments of this invention relates to the preparation of o-nitrodiphenylamine and comprises reacting o-chloronitrobenzene with aniline at a temperature of from about 175° C. to about 225° C. in the presence of magnesium oxide while maintaining substantially anhydrous reaction conditions.

Other objects and embodiments of this invention will become apparent in the following detailed specification.

In accordance with the process of this invention a halonitro aromatic compound is reacted with an amino aromatic compound at an elevated temperature while maintaining substantially anhydrous reaction conditions. Illustrative of halonitro aromatic compounds which may be utilized are the three chloronitrobenzenes, i.e., o-chloronitrobenzene, m-chloronitrobenzene and p-chloronitrobenzene, also chloronitroalkylbenzenes including 2-chloro-5-nitrotoluene, 3 - chloro-4-nitrotoluene, 3-chloro-5-nitrotoluene, 3-chloro-6-nitrotoluene, 4-chloro-5-nitrotoluene, and other isomeric chloronitrotoluenes; 2-chloro-5-nitroethylbenzene, 3-chloro-4-nitroethylbenzene, 3-chloro-5-nitroethylbenzene, 3-chloro-6-nitroethylbenzene, 4-chloro-5-nitroethylbenzene and other chloronitroethylbenzenes; 2-chloro-5-nitropropylbenzene, 3 - chloro-4-nitropropylbenzene, etc.; 2-chloro-5-nitroisopropylbenzene, 3 - chloro-4-nitroisopropylbenzene, 3-chloro-5-nitroisopropylbenzene, etc.; and other C-alkylated chloronitrobenzenes; and chloronitronaphthalenes including 1 - chloro-4-nitronaphthalene, 2-chloro-nitronaphthalene, and other chloronitronaphthalenes; and chloronitro derivatives of other aromatic hydrocarbons. The preferred chloronitro aromatic compounds are those containing no functional groups other than chlorine and the nitro group and those in which the nitro group is in ortho position to the chlorine substituent. In a preferred embodiment of this invention the chloronitro aromatic compound is o-chloronitrobenzene.

It is contemplated that other halonitro aromatic compounds may be used although not necessarily with the same or equivalent results. Other suitable halo aromatic compounds are such as o-bromonitrobenzene, m-bromonitrobenzene, p-bromonitrobenzene, o-fluoronitrobenzene, m-fluoronitrobenzene, p-fluoronitrobenzene, o-iodonitrobenzene, m-iodonitrobenzene, p-iodonitrobenzene, etc.

The halonitro aromatic compound is reacted with an amino aromatic compound including, for example, aniline, o-toluidine, m-toluidine, p-toluidine, o-ethylaniline, m-ethylaniline, p-ethylaniline, o-propylaniline, m-propylaniline, p-propylaniline, o-isopropylaniline, m-isopropylaniline, p-isopropylaniline, o-butylaniline, m-butylaniline, p-butylaniline, o-sec-butylaniline, m-sec-butylaniline, p-sec-butylaniline, o-isobutylaniline, m-isobutylaniline, p-isobutylaniline, o-tert-butylaniline, m-tert-butylaniline, p-tert-butylaniline, o-nitroaniline, m-nitroaniline, p-nitroaniline, alphanaphthylamine, beta-naphthylamine, etc. Mono-N-alkyl derivatives of these amines may also be used but not necessarily with equivalent results. It is contemplated that o-aminophenol, p-aminophenol, and the like can also be utilized in accordance with the process of this invention. In general, primary amino aromatic compounds having the general formula $ArNH_2$ are preferred, Ar being an aromatic hydrocarbon radical. In a preferred embodiment the amino aromatic compound is aniline.

Catalysts are very often useful in effecting the condensation reaction herein contemplated, certain copper catalysts, particularly copper salts and copper oxide, are generally disclosed as suitable for this purpose. While cuprous chloride is preferred, other copper catalysts may be used including cuprous oxide, copper bromides, copper fluorides, copper iodides, copper nitrate, copper sulfate, etc. However, when the halo and nitro group of the halonitro aromatic compound starting material are in ortho position to each other on the aromatic nucleus, it is preferable to omit the catalyst since such halonitro aromatic compounds are somewhat more reactive than is the case where the halo and nitro groups are in a position meta or para to each other.

As has been stated, hydrogen halide is formed during the course of the condensation reaction herein contemplated and it is necessary to separate the same in order to avoid formation of undesirable hydrogen halide salts of the aromatic amine reactant. An essential feature of this invention is in the utilization of an oxide of a metal of Group II of the Periodic Table as a hydrogen halide acceptor. While the hydrogen halide acceptors of this invention are not necessarily advantageous over prior art hydrogen halide acceptors, e.g., potassium carbonate, when utilized with substantially pure chloronitro aromatic compound starting materials, a definite advantage does occur when the case is otherwise. For example, when potassium carbonate is utilized together with pre-distilled o-chloronitrobenzene, tarry by-products are formed in only minute quantities. However, when the o-chloronitrobenzene starting material has not been so treated there is a noticeable increase in tarry by-products. This has not been found to be the case when the hydrogen chloride acceptors of this invention are employed. In the latter case, formation of the undersirable tarry materials is minimized whether or not the o-nitrochlorobenzene starting material has been pre-distilled. Of the oxides of metals of Group II, i.e., beryllium oxide, magnesium oxide, calcium oxide, strontium oxide, and barium oxide are preferred. It is preferred to utilize at least stoichiometric quantities of the selected hydrogen halide acceptor.

The ultimate product yield is largely dependent upon a substantially anhydrous reaction media. It is therefore desirable that there be provision for the continuous separation and removal of water, formed by the reaction between the selected Group II metal oxide and hydrogen chloride, for example, from the reaction zone. Such separation can be accomplished in any suitable manner. A preferred method is by azeotropic distillation wherein the water is continuously removed by reflux methods as an azeotropic mixture with an inert diluent, such as benzene, or with the aromatic amine reactant, provision usually being made for recycling the aromatic amine reactant or the diluent to the reaction zone.

Reaction temperatures in the range of from about 150° C. to about 300° C., and preferably in the range of from about 175° C. to about 225° C. are utilized. Pressure does not appear to be an important variable in this process, except that superatmospheric pressures are preferred to control the reflux rate when operating within the aforesaid temperature range. It follows that the desired pressure will vary from the particular reactants and diluent utilized. The pressure may be autogenous to 1000 p.s.i.g. or more.

In general, a molar excess of the amino aromatic compound to the chloronitro compound is utilized. The molar excess can be as much as 10:1 or more. However, when utilizing an inert diluent such as benzene, excessive amounts of the amino aromatic compound are not necessary and it is preferred that the molar excess in such case be in a lower ratio, say from about 5:4 to about 3:1.

The process of this invention can be effected in any suitable manner and may comprise a batch or a continuous type of operation. For example, in a batch type of operation, the reactants can be charged to a reaction vessel together with the hydrogen halide acceptor. An enclosed glass vessel equipped with heating and mixing means, and embodying an overhead reflux condenser together with a receiver is a suitable reaction vessel. The refluxing azeotropic mixture is recovered in the receiver and water separated therefrom to maintain substantially anhydrous reaction conditions. The reactants are stirred together with the hydrogen halide acceptor and heated at reaction conditions until such time as water is no longer recovered from the reflux condenser. The reaction product is thereafter separated from the hydrogen halide acceptor, water-washed, and dried and distilled to recover the desired products.

In one continuous type of operation, the reactants can be pre-mixed in the desired ratio and thereafter charged to a reactor, maintained at the prescribed reaction conditions, in a single stream, or said reactants can be charged individually and in separate streams. The hydrogen halide acceptor can be charged to the reaction zone as a slurry or suspension in one or both of the reactants, or maintained in the reaction zone as a fixed bed therein. The reactor effluent is passed to a water separator wherein water is continuously or periodically withdrawn and measured as a means of observing the extent of the reaction. The reaction product is thereafter passed through a waterwash, separated therefrom, and dried. The dried reaction product is then charged to a fractionating column for product recovery and separation of unreacted materials, provision being made for recycle of the unreacted materials.

The following examples are presented in illustration of the process of this invention and are not intended to limit the generally broad scope of the invention as set out in the appended claims.

Example I

Four moles of aniline, 1 mole of o-nitrochlorobenzene, about 0.6 mole of powdered calcium oxide and about 20 cc. of benzene were charged to a 2-liter enclosed glass vessel equipped with a mechanical stirrer, a short vertical overhead column of glass helices with an overhead reflux condenser, and a Stark and Dean trap for separation of the water-of-reaction. The reaction mixture was heated at a temperature of 180° C. with stirring over a period of 24 hours, during which time about 8 cc. of water was separated from the reaction mixture. Thereafter, the reaction mixture was cooled. Water and benzene were added and the mixture acidified for the separation of calcium oxide. The aqueous phase was separated and titrated to determine chloride ion concentration. Distillation of the organic phase gave a benzene cut, a second cut (289 grams) comprising mostly aniline but also 2.9% unreacted o-nitrochlorobenzene and a trace amount of the o-nitrodiphenylamine product, and bottoms (197 grams) comprising 13.3% unreacted o-nitrochlorobenzene and 84.7% o-nitrodiphenylamine with about 1% of tarry higher boiling by-products. Analysis was by gas-liquid chromatography methods. The conversion per pass (moles of o-nitrodiphenylamine product per moles of o-nitrochlorobenzene charged) is 77% with an ultimate conversion (moles of o-nitrodiphenylamine product per mole of o-nitrochlorobenzene reacted) of 99%.

Example II

Eight moles of aniline, 2 moles of o-nitrochlorobenzene, about 20 cc. of benzene and about 1.1 moles of powdered potassium carbonate were charged to the reaction apparatus of Example I. The reaction mixture was heated at a temperature of 192° C. with stirring over a period of 24 hours, during which time about 23 cc. of water was separated from the reaction mixture. Thereafter, the reaction mixture was cooled. Water and benzene were added and the mixture acidified for the separation of potassium carbonate. The aqueous phase was separated and titrated to determine chloride ion concentration. Distillation of the organic phase gave a benzene cut, a second cut (562 grams) comprising aniline and 56.2% unreacted o-nitrochlorobenzene, and bottoms (404 grams) comprising 0.9% unreacted o-nitrochlorobenzene and 96.1% o-nitrodiphenylamine with about 9% of tarry higher boiling by-products. Analysis was by gas-liquid chromatography methods. The conversion per pass is 83% with an ultimate conversion of 85%.

Example III

Four moles of aniline, 1 mole of o-nitrochlorobenzene, about 20 cc. of benzene and about 0.6 mole of powdered calcium oxide were charged to the reaction apparatus of Example I. The reaction mixture was heated at a temperature of 190° C. with stirring over a period of 24 hours, during which time about 9 cc. of water were separated from the reaction mixture. Thereafter, the reaction mixture was cooled. Water and benzene were added and the mixture acidified for the separation of calcium oxide. The aqueous phase was separated and titrated to determine chloride ion concentration. Distillation of the organic phase gave a benzene cut, a second cut (224 grams) comprising aniline and 0.8% unreacted o-nitrochlorobenzene, 1.0% of the o-nitrodiphenylamine product, and bottoms (275 grams) comprising aniline, 4.9% unreacted o-nitrochlorobenzene and 67.5% o-nitrodiphenylamine product and no tarry higher boiling by-products. Analysis was by gas-liquid chromatography methods. The conversion per pass is 91% with an ultimate conversion of 99%.

Example IV

Four moles of aniline, 1 mole of o-nitrochlorobenzene, about 20 cc. of benzene and about 0.6 mole of powdered magnesium oxide are charged to the reaction apparatus of Example I and reacted therein at a temperature of about 185° C. with stirring over a 24 hour period, during which time about 9 cc. of water are formed and separated. The reaction mixture is cooled, admixed with benzene and water, and acidified to separate magnesium oxide. The organic phase is recovered and distilled. Bnezene is separated at atmospheric pressure and unreacted aniline under reduced pressure. The residual reaction mixture comprises about 14% unreacted o-nitrochlorobenzene, 86% o-nitrodiphenylamine and from a trace amount to about 1% of higher boiling by-products.

I claim as my invention:

1. A process for the preparation of a nitrodiarylamine which comprises reacting an amino aromatic compound of the formula $ArNH_2$ with a halonitro aromatic compound of the formula $X-Ar'-NO_2$, in which Ar and Ar' are aromatic hydrocarbon radicals and X is halogen, in the presence of calcium oxide or magnesium oxide while maintaining substantially anhydrous reaction conditions.

2. The process of claim 1 wherein said halonitro aromatic compound is a chloronitrobenzene.

3. The process of claim 2 wherein said reaction conditions include a temperature of from about 150° C. to about 300° C.

4. The process of claim 3 wherein said halonitro aromatic compound is p-chloronitrobenzene.

5. The process of claim 3 wherein said halonitro aromatic compound is o-chloronitrobenzene.

6. A process for the preparation of o-nitrodiphenylamine which comprises reacting o-chloronitrobenzene with aniline at a temperature of from about 175° C. to about 225° C. in the presence of calcium oxide while maintaining substantially anhydrous reaction conditions.

7. A process for the preparation of o-nitrodiphenylamine which comprises reacting o-chloronitrobenzene with aniline at a temperature of from about 175° C. to about 225 C. in the presence of magnesium oxide while maintaining substantially anhydrous reaction conditions.

8. A process for the preparation of 2-methyl-2'-nitrodiphenylamine which comprises reacting o-toluidine with o-chloronitrobenzene at a temperature of from about 175° C. to about 225° C. in the presence of calcium oxide while maintaining substantially anhydrous reaction conditions.

9. A process for the preparation of 2-methyl-2'-nitrodiphenylamine which comprises reacting o-toluidine with o-chloronitrobenzene at a temperature of from about 175° C. to about 225° C. in the presence of magnesium oxide while maintaining substantially anhydrous reaction conditions.

10. A process for the preparation of N-(o-nitrophenyl)-1-naphthylamine which comprises reacting 1-naphthylamine with p-chloronitrobenzene at a temperature of from about 175° C. to about 225° C. in the presence of calcium oxide while maintaining substantially anhydrous reaction conditions.

References Cited

UNITED STATES PATENTS

| 3,121,736 | 2/1964 | Luvisi et al. | 260—576 |
|---|---|---|---|
| 3,155,727 | 11/1964 | Wilson | 260—571 |
| 3,242,213 | 3/1966 | Preston et al. | 260—558 |

CHARLES B. PARKER, *Primary Examiner.*

P. C. IVES, *Assistant Examiner.*